No. 867,466. PATENTED OCT. 1, 1907.
S. R. BAILEY.
BELT SHIFTER.
APPLICATION FILED JAN. 4, 1907.
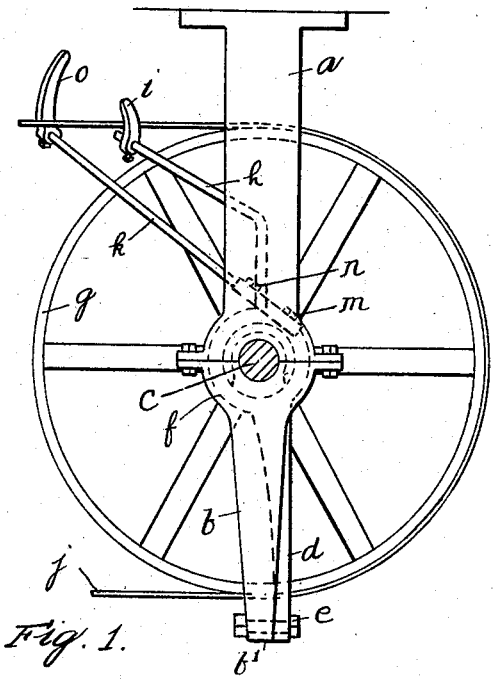
Fig. 1.
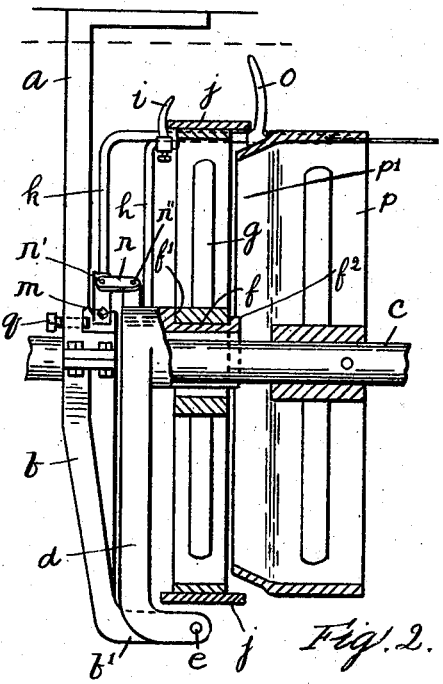
Fig. 2.
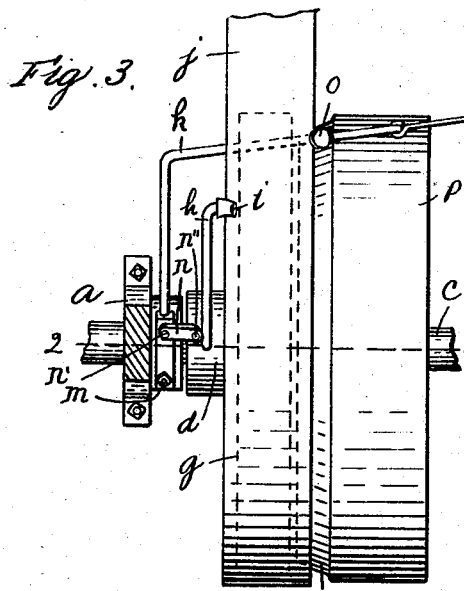
Fig. 3.
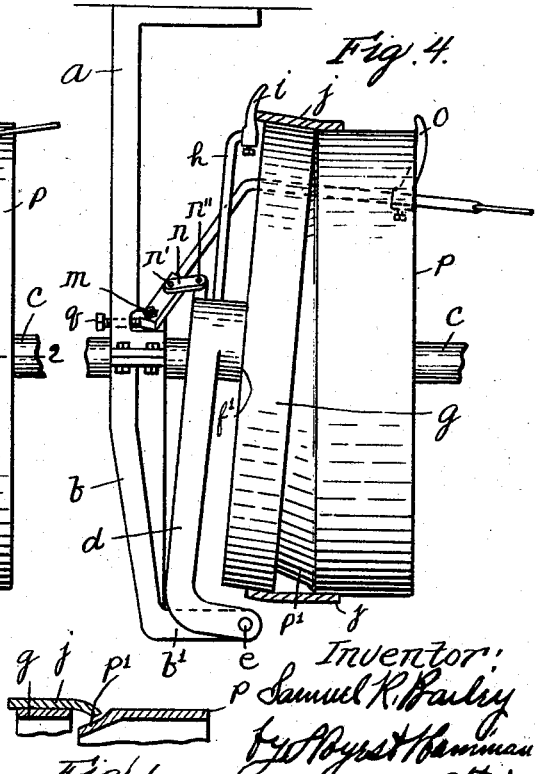
Fig. 4.
Witnesses:
H. B. Davis.
Cynthia Doyle
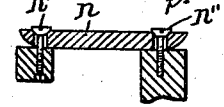
Fig. 5.
Fig. 6.
Inventor:
Samuel R. Bailey
by Boyd & Hamman
Attys

UNITED STATES PATENT OFFICE.

SAMUEL R. BAILEY, OF AMESBURY, MASSACHUSETTS.

BELT-SHIFTER.

No. 867,466.    Specification of Letters Patent.    Patented Oct. 1, 1907.

Application filed January 4, 1907. Serial No. 350,733.

*To all whom it may concern:*

Be it known that I, SAMUEL R. BAILEY, of Amesbury, county of Essex, State of Massachusetts, have invented an Improvement in Belt-Shifters, of which the following description, in connection with the accompanying drawings, is a specification, like characters on the drawings representing like parts.

This invention relates to certain improvements in belt shifters of the character shown in my prior patents #818,654 and #818,931, of April 24, 1906, in which the belt holder or idle pulley is provided with means whereby the belt will be caused to project or overhang the space between the idle pulley and the fast pulley, and means is provided for moving the idle pulley so as to carry this overhanging edge portion into engagement with the fast pulley to cause the belt to run onto the latter.

The object of the present invention is to provide, in a device of the above character, an improved means for moving the idle pulley so as to shift the belt onto the fast pulley. I accomplish this object by the means shown in the accompanying drawing, in which, Figure 1 is an end elevation of a belt shifter made according to my invention. Fig. 2 is a central vertical section on the line 2—2, of Fig. 3. Fig. 3 is a plan view. Fig. 4 is a side elevation showing the parts in position to transfer the belt onto the fast pulley. Fig. 5 is a detail sectional view of the shipper and hub connecting link. Fig. 6 is a detail view showing the action of the belt under some conditions.

According to the present invention the hanger $a$, which is attached to the ceiling, is provided with an extension $b$, which is secured to the lower end thereof, the lower end of said hanger and the upper end of said extension being recessed to receive the main shaft $c$, on which the fast pulley $p$ is mounted. The lower end of the hanger extension $b$ is provided with a horizontally extending portion $b'$, to which an arm $d$ is pivotally connected by means of pivot pin $e$. Said arm $d$ extends upwardly at one side of the shaft $c$, over and partly about the same, and is provided with an integral hub $f$ which projects therefrom, and is open at its under side to permit it to be placed upon the shaft in approximately axial alinement therewith, but out of contact therewith, as in all other devices of this character.

The idle pulley $g$ is mounted on the hub $f$ and is held from axial movement on said hub by shoulders $f'$ and a collar $f^2$. A stop arm $h$ is mounted in the hub $f$ and extends obliquely upward, and has a horizontal portion at its end which extends parallel to the shaft on which a stop finger $i$ is adjustably mounted in position to engage the adjacent edge of the belt $j$, said arm and finger having the same function and construction as the corresponding devices illustrated in my said prior patent #818,931.

The shipping lever $k$ is pivoted in an oblique position upon the hanger $a$ by means of the pivot bolt $m$, and said lever is connected to the hub $f$ by means of a link $n$, which is pivoted to said lever and to said hub by means of bolts $n'$, $n''$ having sufficiently loose connections therewith to permit a slight swinging movement longitudinally of said pivot bolts. The lever $k$ is provided with a belt engaging finger $o$, which is adjustably mounted on the horizontally extending end portion thereof. The fast pulley $p$ which is mounted on the shaft $c$ adjacent the idle pulley $g$, is provided with an obliquely extending annular lip $p'$, which is adapted to extend within the rim of the idle pulley $g$, and serves to guide the belt from the idle to the fast pulley. In my prior patent #818,931 a lip, adapted to perform a similar function is shown, said lip, however, being shown as extending horizontally or parallel to the shaft, but I have found in practice that the overhanging edge of the belt tends to turn or hang down, so that when the belt is dead it rests or touches this projecting lip, when arranged as in said prior patent, thereby causing considerable wear on the belt and loss of power. I have found that by inclining the projecting lip inwardly as shown, it is practically impossible for the edge of the belt to hang down far enough to drag thereon, and, furthermore, that such inclination does not prevent it performing its function of guiding the edge of the belt onto the fast pulley.

The operation of the above described device is as follows. The belt shifting lever $k$ is drawn forward causing the hub $f$ and arm $d$ to be swung upon the pivot $e$ as a center, so that, instead of sliding the idle pulley on the hub, the lever $k$, by its movement, swings it towards the fast pulley and carries the projecting edge of the belt into engagement with the lip $p'$ or rim of the fast pulley, as shown in Fig. 4, so that the belt will run onto the middle of the fast pulley. A stop screw $q$ is provided in the hanger to limit the movement of the idle pulley beyond a certain point, so that said pulley will not engage or strike against the fast pulley, although it will be held in close proximity thereto. The belt is run back onto the idle pulley upon a reverse motion of the parts, as will be obvious.

I have shown the idle pulley as pivoted at a point directly under its rim adjacent the middle thereof, for the reason that the tilting motion is less at this point than it would be if it were higher or at one side, and for the reason that the swinging motion does not then carry the lower portion of the idle pulley away from the fast pulley, as it would if the pivot were higher than the low part of the rim. The precise location shown is not, however, essential, and may be varied to a considerable extent without seriously interfering with the effectiveness of the operation. It is preferable, however, to have the pivot so located, that the center of gravity of the arm $d$, hub $f$ and pulley $g$ passes over the pivot e when these parts are moved from the position of Fig. 3 to the position of Fig. 4 as by this means these parts will be held in these positions by gravity. The pivot e must further be so disposed that the weight of the belt on the idle pulley will not cause the latter to swing towards the fast pulley unless other means are provided to prevent such action.

Having thus described my invention, what I claim as new and desire to secure by Letters Patent is:—

1. In combination with a fast pulley, a belt driven thereby, an idle pulley, a hub on which said idle pulley is mounted, and a pivotal support for said hub located to hold the idle pulley at one side of the fast pulley in position to permit the idle-pulley to be swung to carry the belt into engagement with the fast pulley, substantially as described.

2. In combination with a fast pulley, a belt driven thereby, an idle pulley, a hub on which said idle pulley is mounted, and a pivotal support for said hub located beneath the rim of the idle pulley and in position to hold the same at one side of the fast pulley to permit it to carry the belt into engagement with the fast pulley, substantially as described.

3. In combination with a fast pulley, a belt driven thereby, an idle pulley, a hub on which said idle pulley is mounted, and a pivotal support for said hub located to hold the idle pulley at one side of the fast pulley in position to permit the idle-pulley to be swung to carry the belt into engagement with the fast pulley, said pivotal support being also so located that the center of gravity of said hub and said idle pulley passes thereover as the idle pulley is moved to carry the belt towards the fast pulley, substantially as described.

4. In combination with a fast pulley, a belt driven thereby, and a belt holder at one side of said fast pulley adapted to support the belt with its edge portion projecting therefrom and to carry said edge portion into engagement with the fast pulley, said fast pulley having an obliquely and inwardly extending belt-guiding projection at its edge, adjacent the holder, adapted to extend within said projecting portion of the belt out of contact therewith, substantially as described.

In testimony whereof, I have signed my name to this specification, in the presence of two subscribing witnesses.

SAMUEL R. BAILEY.

Witnesses:
L. H. HARRIMAN,
H. B. DAVIS.